(12) United States Patent
Fujioka

(10) Patent No.: US 9,501,750 B2
(45) Date of Patent: Nov. 22, 2016

(54) WEBTOP AND MONETIZATION ENGINE, SYSTEM AND METHOD

(75) Inventor: Robb Fujioka, Manhattan Beach, CA (US)

(73) Assignee: Mattel, Inc., El Segundo, CA (US)

( * ) Notice: Subject to any disclaimer, the term of this patent is extended or adjusted under 35 U.S.C. 154(b) by 714 days.

(21) Appl. No.: 12/383,456

(22) Filed: Mar. 24, 2009

(65) Prior Publication Data

US 2010/0218109 A1 Aug. 26, 2010

Related U.S. Application Data

(60) Provisional application No. 61/070,611, filed on Mar. 24, 2008.

(51) Int. Cl.
| | |
|---|---|
| G06Q 30/02 | (2012.01) |
| G06Q 10/00 | (2012.01) |
| G06F 3/0485 | (2013.01) |
| G06F 3/0483 | (2013.01) |
| G06Q 30/00 | (2012.01) |
| G06Q 30/06 | (2012.01) |

(52) U.S. Cl.
CPC ............ *G06Q 10/00* (2013.01); *G06F 3/0483* (2013.01); *G06F 3/0485* (2013.01); *G06Q 30/00* (2013.01); *G06Q 30/0253* (2013.01); *G06Q 30/0255* (2013.01); *G06Q 30/0269* (2013.01); *G06Q 30/0601* (2013.01)

(58) Field of Classification Search
CPC ............ G06F 3/0483; G06F 3/0485; G06Q 30/0269
USPC .................................................. 715/850, 836
See application file for complete search history.

(56) References Cited

U.S. PATENT DOCUMENTS

| | | |
|---|---|---|
| 6,480,753 B1 | 11/2002 | Calder et al. |
| 7,630,986 B1 * | 12/2009 | Herz et al. |
| 2004/0024719 A1 * | 2/2004 | Adar et al. ...................... 706/12 |
| 2004/0098360 A1 | 5/2004 | Witwer et al. |
| 2005/0137015 A1 * | 6/2005 | Rogers et al. .................. 463/42 |
| 2005/0149397 A1 * | 7/2005 | Morgenstern et al. ......... 705/14 |
| 2005/0216346 A1 | 9/2005 | Kusumoto et al. |
| 2007/0168863 A1 | 7/2007 | Blattner et al. |

(Continued)

OTHER PUBLICATIONS

Engadget—Phoenix Technologies launches HyperSpace "instant on" embedded OS, Nov. 6, 2007; http://www.engadget/2007/11/06/phoenix-technologies-launches-hyperspace-instant . . . ; pp. 1-3.

(Continued)

*Primary Examiner* — Ryan Pitaro
(74) *Attorney, Agent, or Firm* — Kolisch Hartwell, P.C.

(57) ABSTRACT

Systems and methods for an improved webtop, and a monetization engine that better takes advantage of the interests and life segments of a user, are described. A monetization engine embedded in a hyperspace webtop, is provided which includes a user record having a plurality of information items regarding life segments of at least one user, a presentation engine that presents advertisements to at least the user in accordance with at least one information item, and a plurality of tabs, wherein at least one of the tabs is presented to the user in accordance with at least one information item, and wherein each of the plurality of tabs is indicative of content associated with a third party having available for sale to at least one user at least one selected from the group including of a good and a service.

28 Claims, 7 Drawing Sheets

(56) References Cited

U.S. PATENT DOCUMENTS

| | | | |
|---|---|---|---|
| 2008/0250315 A1* | 10/2008 | Eronen et al. | 715/706 |
| 2008/0263458 A1* | 10/2008 | Altberg | H04L 12/66 715/757 |
| 2008/0294998 A1* | 11/2008 | Pyhalammi et al. | 715/748 |
| 2008/0301562 A1* | 12/2008 | Berger et al. | 715/733 |
| 2008/0313035 A1* | 12/2008 | Peeters et al. | 705/14 |
| 2009/0006206 A1* | 1/2009 | Groe et al. | 705/14 |
| 2009/0019366 A1* | 1/2009 | Abhyanker | 715/706 |
| 2009/0037291 A1* | 2/2009 | Dawson et al. | 705/27 |
| 2009/0063283 A1* | 3/2009 | Kusumoto | G06Q 30/02 705/14.25 |
| 2009/0070221 A1* | 3/2009 | Carmichael et al. | 705/14 |
| 2009/0113349 A1* | 4/2009 | Zohar et al. | 715/852 |
| 2009/0115776 A1* | 5/2009 | Bimbra et al. | 345/419 |
| 2009/0125383 A1* | 5/2009 | Jung et al. | 705/10 |
| 2009/0138355 A1* | 5/2009 | Jung et al. | 705/14 |
| 2009/0157495 A1* | 6/2009 | Cahuzac et al. | 705/14 |
| 2009/0158170 A1* | 6/2009 | Narayanan et al. | 715/753 |
| 2009/0259946 A1* | 10/2009 | Dawson et al. | 715/747 |
| 2010/0017260 A1* | 1/2010 | Hamilton et al. | 705/10 |
| 2010/0058208 A1* | 3/2010 | Finn et al. | 715/764 |
| 2010/0114702 A1* | 5/2010 | Wu et al. | 705/14.53 |
| 2010/0146401 A1* | 6/2010 | Fubioka | 715/747 |
| 2010/0169798 A1* | 7/2010 | Hyndman et al. | 715/757 |
| 2011/0010272 A1* | 1/2011 | Ur | 705/27.2 |
| 2011/0055726 A1* | 3/2011 | Hamilton et al. | 715/753 |
| 2011/0107239 A1* | 5/2011 | Adoni et al. | 715/757 |
| 2012/0117485 A1* | 5/2012 | Brindley et al. | 715/744 |

OTHER PUBLICATIONS

Engadget—DeviceVM's SplashTop: more info about the five second Linux system, Oct. 9, 2007; http://www.engadget.com/2007/10/09/devicevms-splashtop-more-info-about-the-five-seco . . .; pp. 1-3.

Engadget—ASUS P5E3 Deluxe mobo boots in five seconds with embedded Linux, Oct. 8, 2007; http://www.engadget.com/2007/10/08/asus-p5e3-deluxe-mobo-boots-in-five-seconds-with- . . . ; pp. 1-2.

InfoWorld—Phoenix Technologies tries again with instant-on apps, Nov. 5, 2007; http://www.infoworld.com/article/07/11/05/Phoenix-Technologies-tries-instant-on-apps_1 . . . ; pp. 1-2.

* cited by examiner

WEBTOP AND MONETIZATION ENGINE, SYSTEM AND METHOD

This application claims priority to Application Ser. No. 61/070,611, entitled "WEBTOP AND MONETIZATION ENGINE, SYSTEM AND METHOD", filed Mar. 24, 2008, the entire disclosure of which is hereby incorporated by reference as being set forth in its entirety herein.

BACKGROUND OF THE INVENTION

Field of the Invention

The present invention relates to internet use, and, more specifically, to a webtop and monetization engine, system and method.

Description of the Background

In a typical computer-use in the present art, a user, upon each usage of a computer, must sit for a lengthy session of logging into a laundry list of websites, e-mail accounts, and computing communities or social networks. Alternatively, a user may use multiple browser, browser tabs, or favorite site marking to maintain the often lengthy list of internet locations frequented. Thus, the current art offers no personalized, organized and convenient digital experience. Further, even were the available art to offer such an improved, personalized experience, the experience would not be relevant to the different aspects, or segments, of a typical user's life, such as Work, Family, Entertainment, Community, etc. Additionally, this lack of understanding of the segments, and important elements, of a typical user's life, as well as a lack of involvement in the web-surfing process, limits the marketing and sales opportunities available in the present art.

Thus, the need exists for an improved webtop, and a monetization engine, system and method that better takes advantage of the interests and life segments of a user.

SUMMARY OF THE INVENTION

The present invention is directed to a monetization engine, system and method embedded in a hyperspace webtop, including a user record having a plurality of information items regarding life segments of at least one user, a presentation engine that presents advertisements to at least the user in accordance with at least one information item, and a plurality of tabs, wherein at least one of the tabs is presented to the user in accordance with at least one information item, and wherein each of the plurality of tabs is indicative of content associated with a third party having available for sale to at least one user at least one selected from the group including of a good and a service.

The present invention solves problems experienced with the prior art because it provides for an improved webtop, and a monetization engine, system and method that better takes advantage of the interests and life segments of a user. Those and other advantages and benefits of the present invention will become apparent from the detailed description of the invention hereinbelow.

BRIEF DESCRIPTION OF THE DRAWINGS

Understanding of the present invention will be facilitated by consideration of the following detailed description of the embodiments of the present invention taken in conjunction with the accompanying drawings, in which like numerals refer to like parts and in which.

DESCRIPTION OF THE INVENTION

It is to be understood that the figures and descriptions of the present invention have been simplified to illustrate elements that are relevant for a clear understanding of the present invention, while eliminating, for the purposes of clarity, many other elements found in typical computing apparatuses, systems and methods. Those of ordinary skill in the art will recognize that other elements are desirable and/or required in order to implement the present invention. However, because such elements are well known in the art, and because they do not facilitate a better understanding of the present invention, a discussion of such elements is not provided herein.

Figure 1A:
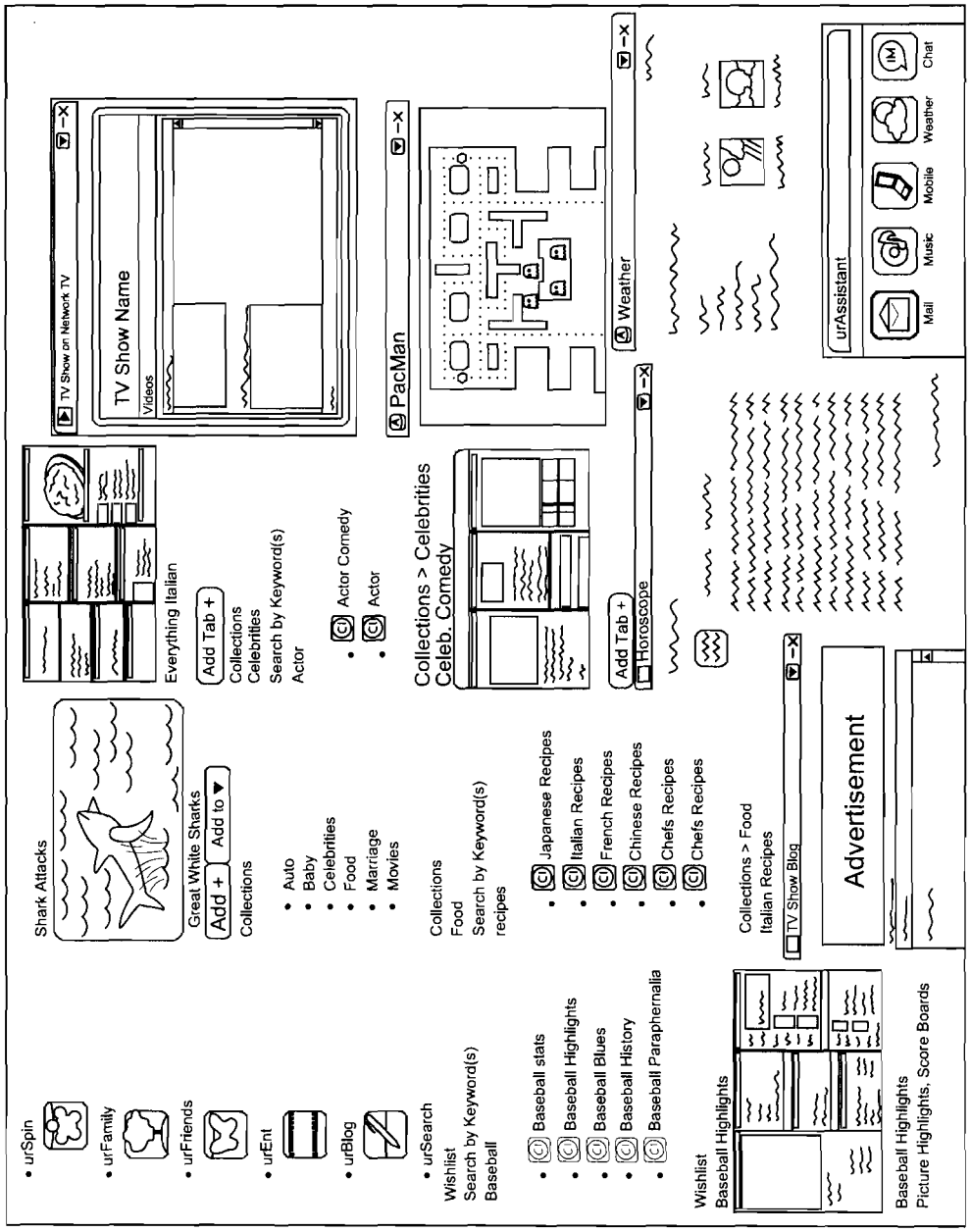
FIG. 1a is a illustrative representation of the monetization engine according to an aspect of the present invention.
Figure 1B:
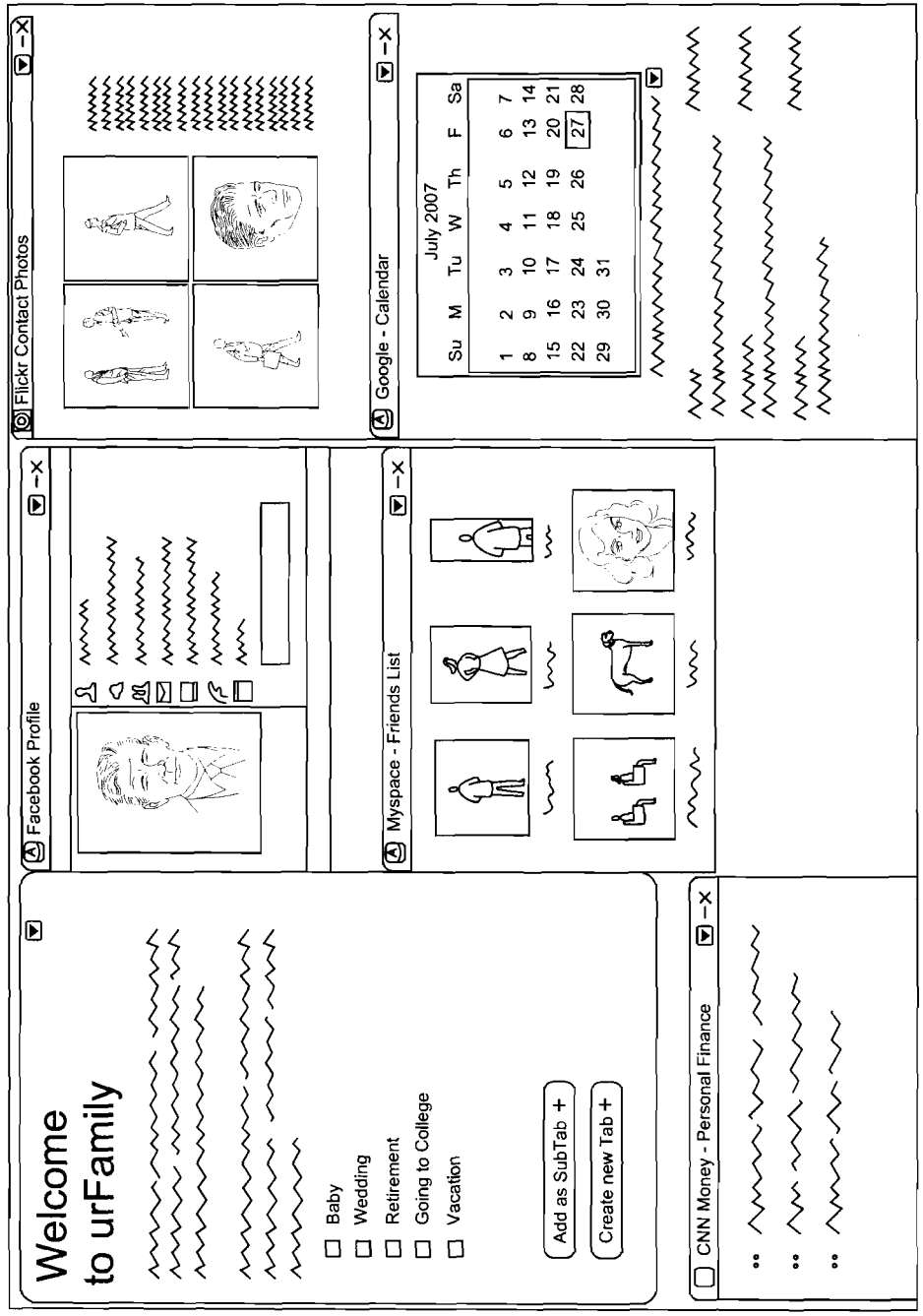
FIG. 1b is a illustrative representation of the monetization engine according to an aspect of the present invention.
Figure 1C:
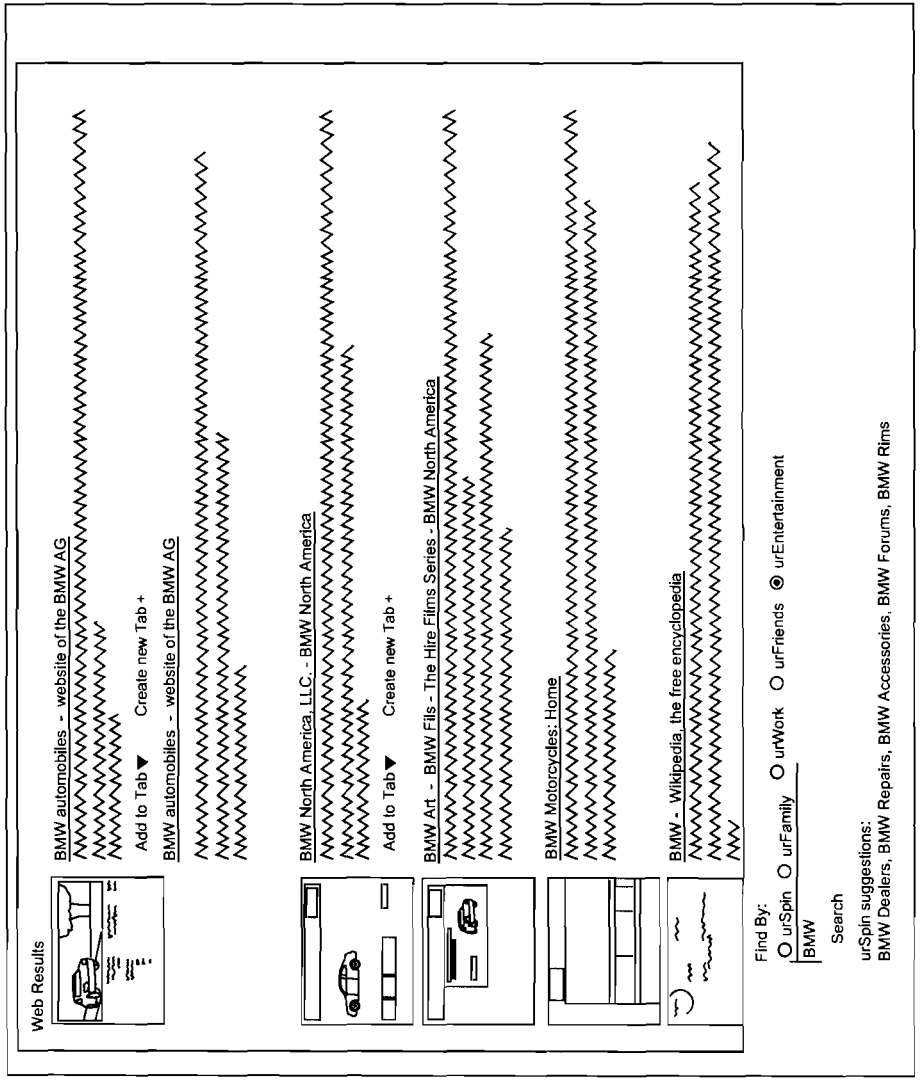
FIG. 1c is a illustrative representation of the monetization engine according to an aspect of the present invention.
Figure 2:
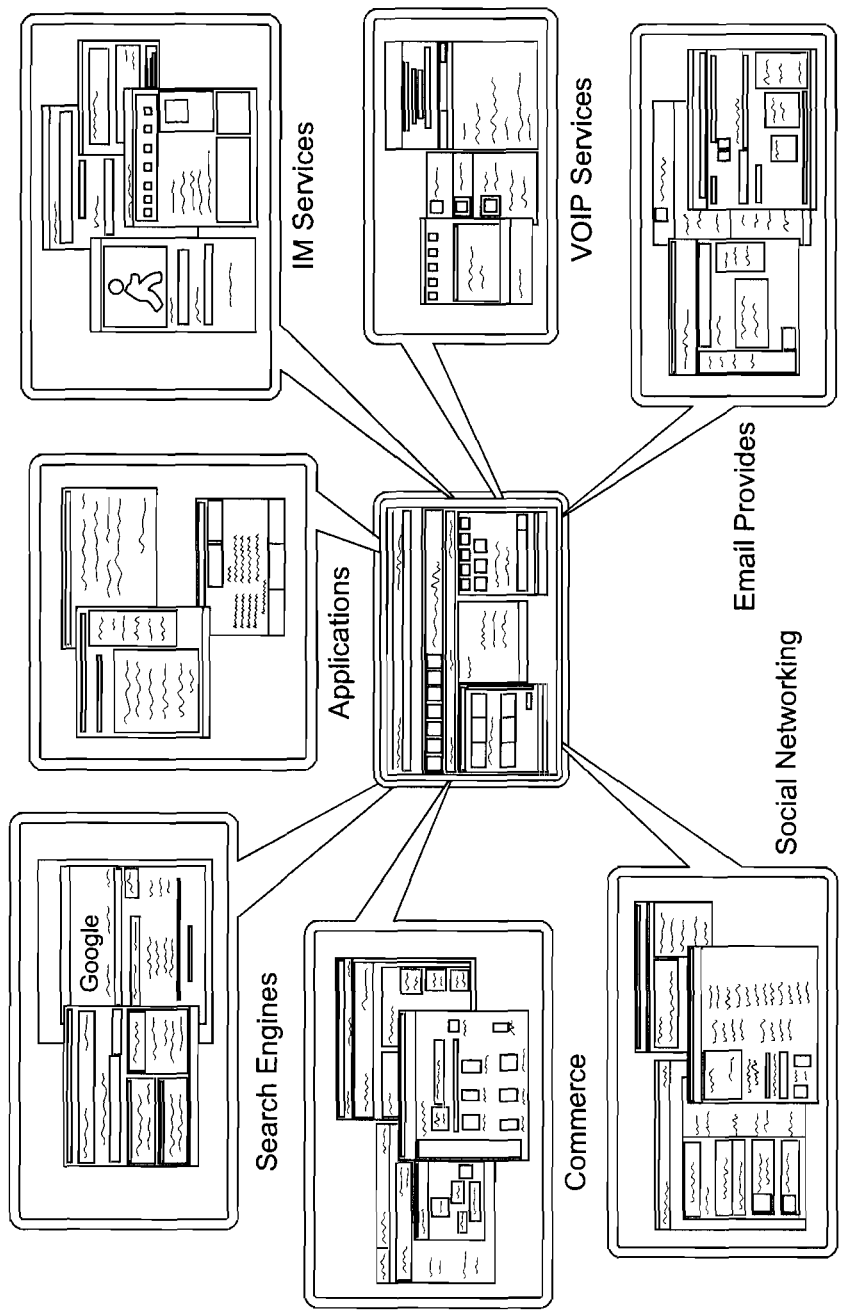
FIG. 2 is a illustrative representation of the monetization engine according to an aspect of the present invention.

The present invention may include a personalized webtop, such as that shown in FIG. 1a-c. The personal webtop of the present invention may function and behave much like a traditional Personal Computer ("PC") desktop. However, although the webtop can run entirely inside a traditional web browser, its functionality is not limited to a single device or platform. For example, the webtop may offer drag-and-drop content functionality, web-based centralized storage, and collaboration tools, and thereby the webtop may become the centralized storage and access point for all content and web applications a user desires. It may utilize a core structure based on any of a variety of factors, such as life-segment, and may present dynamic data triggered by key events correspondent to the core structure, such as key life events (e.g., having a baby, going to college). By dividing the webtop into segments around a core structure (work, family, entertainment, and community, for example), a better understanding of the users is made available, thereby allowing for development of strategic marketing and monetization channels, as well as presently unavailable partnerships, all to the benefit of the user and the marketer. For example, as depicted in FIG. 2, the user may access favorite web properties, including multiple sites, IM services, VOIP services, email accounts, and social networking sites, to name a few. Needless to say, each such web property may create a monetizable avenue. Further, it almost goes without saying that, due to the nature of the aforementioned webtop, and its capability for use in an application space within a hypervisor, for example, the monetization events discussed herein throughout, including those based on ad serving, may be performed within a hyperspace.

For example, either through the aforementioned webtop, or via a prior art desktop or webtop, users may be provided the capability to create their own content rich widgets, which may be, in whole or in part, sponsored by advertisers. These widgets may, for example, have click through capability to purchase the sponsored product (e.g., click to Amazon or iTunes, for example). Further, the present invention may allow for a search engine to locate such widgets, or preferred portions of a widget for placement into an overall widget, and such searching may be monetized for these widgets in the manner in which presently available "web crawling" search engines, such as Google or Yahoo!, are monetized.

A widget in accordance with the present invention, and as will be understood by one of ordinary skill in the art, is a portable portion of code that may be installed or executed within any separate HTML based webpage by an end user without necessitating additional compilation of that code portion. Such widget code portions, in accordance with the present invention, are embeddable by the end user. As such, a widget in accordance with the present invention is any code portion that may be embedded by the end user within a selected page of HTML, XML, or like code that causes presentation of that selected web page. The widget, via the embedded code portion, thereby adds non-static content to the subject webpage.

A widget in accordance with the present invention may allow a user to take a discreet portion of a favored user experience on a network, such as a portion of favorite interactive information, a favorite website, or a particular application, and transport that favorite portion for use in an approved on-line experience targeted to the particular interests of that user. For example, such a widget constituting a discreet portion of a favored user experience may be applied to the aforementioned web top experience to personalize such a desktop or web top experience to that particular user. Further, such widgets in the present invention may allow for transport of a favored user experience to other user experience locations, such as computing communities and/or social networking sites, in order to improve that user's experience of such other sites or network locations. Needless to say, as used herein a network or network experience is and includes an internet, intranet, extranet, telecommunications network, and any other network experience that allows for importation of the widget concept. Thus, via the creation of an improved user experience on a webtop or desktop, and/or via allowing for the transport of a favored user experience, the user may be charged an appropriate fee, thereby allowing for a monetization event.

Figure 3:
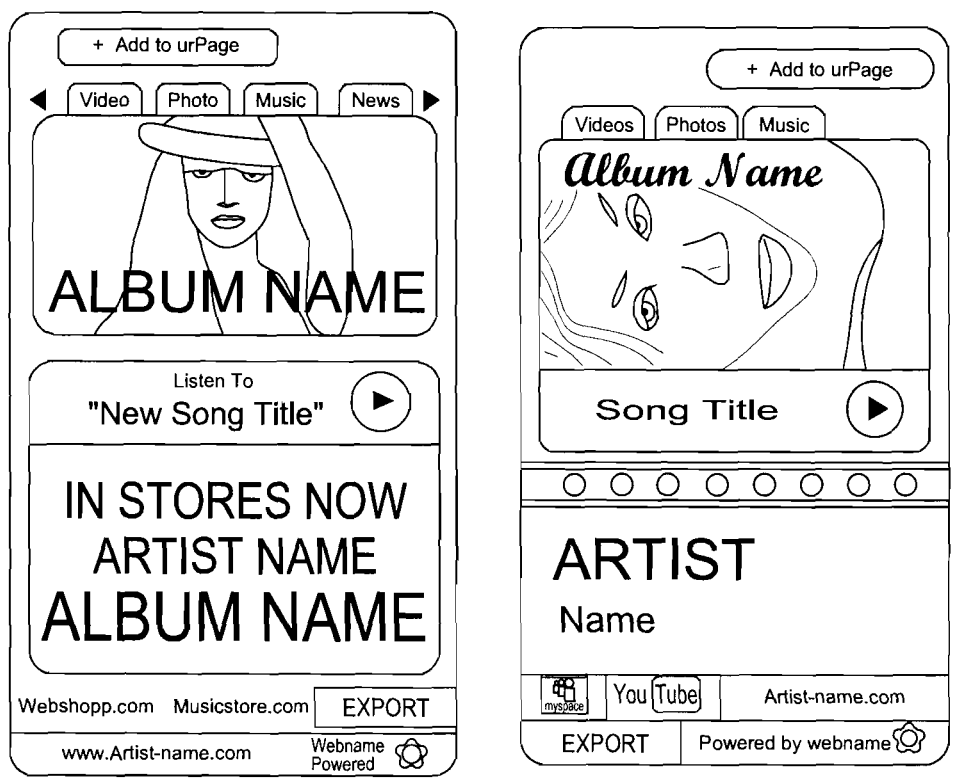
FIG. 3 is a illustrative representation of the monetization engine according to an aspect of the present invention.

In an exemplary embodiment of the present invention, the widgets may be located by a user, or designed by a user, in accordance with preferred techniques. Such preferred techniques may include, for example, in the case of the user-defined widget, the provision of widget templates, into which a user may develop that user's own unique widgets by using discreet physical locations within such template to place code for the subject widget in an overall widget physical format provided by the template. For example, such a widget template may be divided into fields, wherein a user may be given discreet options for each portion of the field as to what widget content the user wishes the ultimate widget to have in that field. For example, the user may click on a particular field, such as the upper left quadrant of the subject widget as illustrated in FIG. 3, and may be presented with a series of content links that are authorized for incorporation into the widget, or a dropdown menu from which the user can select authorized types of content for that portion of the widget, or a hierarchal dropdown menu from which the user can select a top level, and subsequently more specific levels of allowed content from the available authorized content. The user may thereby be charged for the placement of such content into a widget field.

Further, the use of particular content in one portion of a widget template may limit the allowable content in other portions of the widget template. For example, once a user elects to have a quadrant of a widget themed in accordance with a particular musical artist, the template may limit the allowable artists that may be involved in other portions or quadrants of the widget template. Marketed entities or marketers may pay a fee for this "exclusivity" service. For example, in the event that an active aspect for the overall widget is incorporated into the upper left quadrant of FIG. 3 in relation specifically to musical artist Eminem, and thereby at least a portion of the widget code relates to artist Eminem, the options available for the remainder of the widget may be limited only to those relating to musical artist Eminem, that is, for musical widget content, all of the code for the overall widget must relate to the artist Eminem, or may be limited to only those artists recording on the same label as Eminem. Upon design of a widget, the user may "publish" the widget to a desired location.

Additionally, a library of existing widgets may be designed to be made available to improve the user experience upon use of a particular web top or desktop. Such a library may be available via a particular website, via a web top application, via a desktop application, or via discreet application, for example. For example, under the assumption that rights are obtained to create widgets for placement into the library with regard to all artists operating under a particular music recording label, widgets may be designed for placement into the library for all artists recording under that music label. Searching this library presents an availability of a particular search fee, if desired, and creates advertising opportunities akin to those employed by prior art search engines.

Similarly, the present invention include a fully portable, widgetized avatar having associated therewith multiple items of information and/or social information that may be generally searched for and/or otherwise requested for association with at least two different computing communities or transactions. Widgetization of the avatar of the present invention necessarily allows for portability of the avatar of the present invention. Needless to say, a monetization event may occur to allow for the generation of a fully transportable, widgetized avatar.

Figure 4:
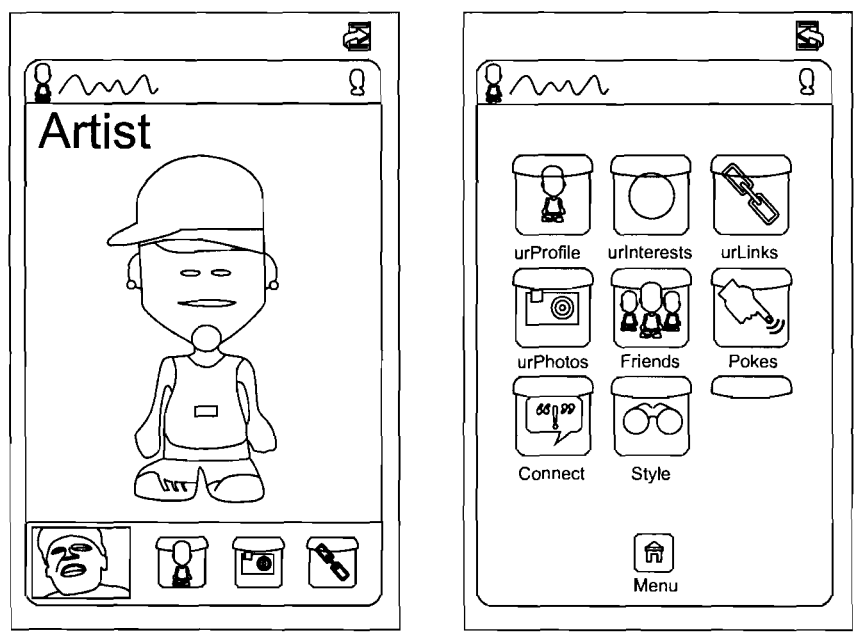
FIG. 4 is a illustrative representation of the monetization engine according to an aspect of the present invention.

The present invention may provide a physical manifestation of all of this information, such as in a "trading card" format widget, as illustrated in FIG. 4. For example, the front of the virtual trading card may include an avatar having particular physical features, clothing, accessories, activities, likes, dislikes and expertise, and the like, along with an associated user name. However, when an interaction, such as selection of a drop-down menu, selection of a link, a double click, or the like is undertaken to "flip" a trading card to the back, a myriad of additional information is displayed regarding the user related to the widgetized avatar, such as age, interests, likes and dislikes, employment status, and the like.

The physical manifestation of a widgetized avatar in accordance with the present invention allows for the monetization of the selection, by the user, of certain clothing or accessories for his or her avatar. For example, a user may pay a fee to access and use certain virtualized clothing and accessories based on the lines of real-world clothing and accessory providers (e.g. Phat Farm, Gucci). Conversely, selection by a user of a virtualized clothing or accessories, such as for the aforementioned fee, may present a high probability upsell of real-world goods to that user. For example, if a user purchases a Gucci purse for her avatar, the probability is higher that the user will want to purchase a real-world Gucci purse for herself. Thus, targeted advertising may be directed to the subject user, or a direct real-world purchase opportunity presented to the user, based on the purchase of virtualized goods. Needless to say, in an alternative embodiment, the reverse case may likewise be true, that is, the purchase of a real-world good may lead to an endeavor to sell a virtualized good. Thus, not only may the sale to the user of virtualized and/or real-world goods be monetized, but likewise the sale of highly targeted advertising, based on clearly and simultaneously known preferences, may also be monetized.

Through the use of the present invention, widgets may be tracked. For example, widgets of the present invention may be associated with a cached identification, which is matched to the widget, and as such each time the widget is dragged and dropped downloaded, or otherwise moved and/or used in a user's desired location, such as a web top, the movement and/or download of the widget is tracked. As such, information with regard to the party's dragging and dropping the widget, or the point to point locations from which a widget is dragged and dropped each time that widget is dragged and dropped, may be tracked by tracking of the associated cached identification. As such, particular metrics, such as Google® metrics, may be associated with each widget, and the use of each widget. Such tracking information may be provided, such as to the publisher, i.e., the third party creator, of a particular widget, in order that the publisher may be enabled to make an accounting for the use and/or download of the widget. Thereby, payment methodologies may be associated with the use and/or download of the widget, and monetization opportunities present based on the tracking information associated with each widget.

Additionally, for example, as will be understood by those skilled in the art in light of the discussion herein, in embodiments wherein the certain characteristics of a user are known to the search engine of the present invention, the downloading of widgets in accordance with the present invention allows for a monitoring of who performed a search, what they deemed most relevant responsive to it, and what was done responsive to that relevance, such as the downloading of a widget. Thus, again, the present invention may provide an advanced marketing and sales tool.

Further, discretely or in association with the aforementioned tracking of widgets, the use of particular widgets may allow for assumptions with regard to the interest of the downloading user of the subject widget. Thereby, monetization, such as advertising monetization, may be associated with the user of the subject widget, such as by allowing for the presentation to the user of particular advertisements, such as from an advertising server, based on the user's use or download of a particular widget. Further, such advertising may be directly associated by the publisher of the subject widget for presentation to the user of the subject widget at predetermined times, or upon predetermined uses of the subject widget. For example, a publisher, i.e., a third party creator, of a subject widget may determine that an advertisement related to that publisher is to be displayed to a user at least once per week following the downloading by that user of a widget associated with that publisher.

Additionally, the webtop discussed herein throughout may include multiple search options, such as those discussed herein throughout and/or multiple search engines, or may present different search options based on any number of factors, such as user characteristics, such as age or income, user preferences, and/or user geographic location. Thereby, monetization from search engine providers may be provided by allowing for the use of different search engines on different devices employing the referenced webtop, i.e. search engine 1 on cell phones and search engine 2 on the internet, and/or the use of different search engines by users in different geographic locations.

Further, the present invention may allow for the presentation of original content, and/or the licensing of third party content and/or content presentation methodologies. Thereby, the present invention allows for a monetization event in capitalizing on advertising revenue when such original and/or licensed content is viewed, such as by a user of the aforementioned webtop.

Figure 5:
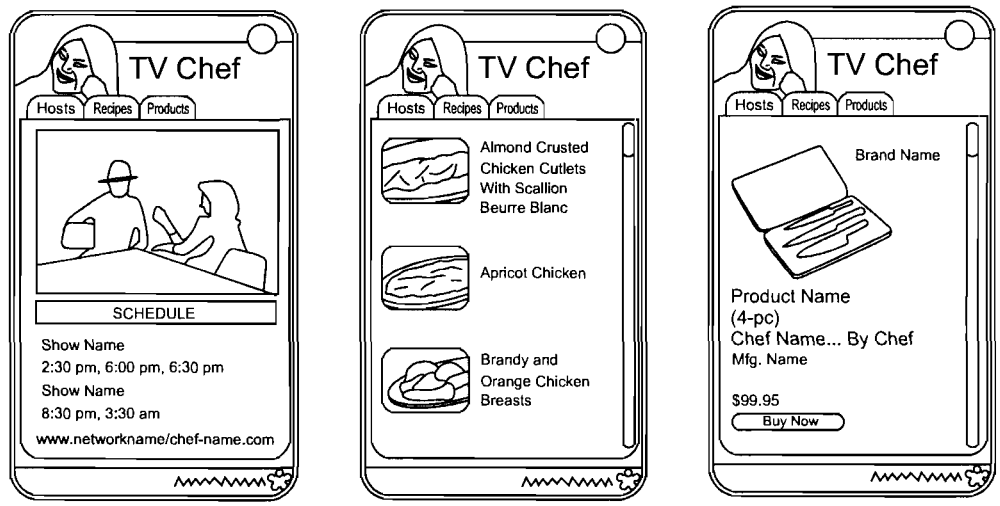
FIG. 5 is a illustrative representation of the monetization engine according to an aspect of the present invention.

Additionally, the present invention may generate revenue by selling "Tabs" on the referenced webtop, as illustrated in FIG. 5, to content providers who want to create their own sub-experience within the webtop. For example, Johnson & Johnson may wish to sponsor the "baby care" tab on the main "cover page" of the subject webtop. Because the webtop of the present invention may operate in an application space of a hyperspace, and thus may be embedded in the device as always being presented to the user as an unchangeable "cover page", such "cover page tabs" may provide a very highly desirable advertising location. To capitalize on this and to provide a compelling user experience, tabs may be provided to a company willing to pay for a tab and maintain a compelling user experience within its respective tab. Of course, as was the case with search methods, tabs may be geographically localized or monetized.

It will be apparent to those skilled in the art, in light of the disclosure herein, that traditional web-based advertising models may likewise be incorporated for use with the present invention.

Although the invention has been described and pictured in an exemplary form with a certain degree of particularity, it is understood that the present disclosure of the exemplary form has been made by way of example, and that numerous changes in the details of construction and combination and arrangement of parts and steps may be made without departing from the spirit and scope of the invention.

What is claimed is:

1. A computer-based system comprising:
   a computer,
   a monetization software engine executing on a hyperspace webtop on the computer,
   wherein the hyperspace webtop has a plurality of user-configurable portions, the plurality of user-configurable portions including two or more of a web site, an instant messaging (IM) service, a voice-over-IP (VOIP) service, an email account, and a social networking site,
   wherein the hyperspace webtop has a widget creation user interface that allows creation of a widgetized avatar and selection of a virtual item for the widgetized avatar, and wherein the widgetized avatar can be dropped into one or more of the plurality of user-configurable portions of the hyperspace webtop; and
   a tracking engine that tracks the use of the widgetized avatar with the plurality of user-configurable portions and sends tracking information of the widgetized avatar to a publisher of the virtual item;
   a presentation engine that presents one or more advertisements on the hyperspace webtop; and
   wherein the hyperspace webtop further comprises a plurality of tabs.

2. The computer-based system of claim 1, wherein the one or more advertisements presented are limited to at least one group of advertisements selected in advance for use.

3. The computer-based system of claim 1, wherein the virtual item is related to at least one third party content and wherein the user has permission to access said at least one third party content.

4. The computer-based system of claim 1, wherein the widgetized avatar is a portable avatar.

5. The computer-based system of claim 1, wherein the widgetized avatar is displayed on a virtual trading card.

6. The computer-based system of claim 1, wherein the virtual item includes at least one item selected from the group of items consisting of avatar attributes, user name, and user preferences.

7. A system, comprising:
a computer,
a monetization software engine executing on a hyperspace webtop on the computer that has a plurality of user-configurable portions, the plurality of user-configurable portions including two or more of a web site, an instant messaging (IM) service, a voice-over-IP (VOIP) service, an email account, and a social networking site,
wherein the hyperspace webtop further has a widget creation user interface that allows creation of a widgetized avatar and selection of a virtual item for the widgetized avatar, and wherein the widgetized avatar can be dropped into one or more of the plurality of user-configurable portions of the hyperspace webtop;
a tracking engine configured to track the use of the widgetized avatar with the plurality of user-configurable portions and sends tracking information of the widgetized avatar to a publisher of the virtual item; and
a remote presentation engine that presents one or more advertisements on the hyperspace webtop based on the tracking information of the widgetized avatar on the hyperspace widget; and
a purchasing engine configured to facilitate one or more purchases of a good or a service for the user and record the one or more purchases associated with the widgetized avatar,
wherein the hyperspace webtop further comprises a plurality of tabs.

8. The computer-based engine of claim 7, wherein at least one purchase is made for the widgetized avatar.

9. The computer-based system of claim 8, wherein the purchasing engine creates at least one new information item in accordance with the at least one purchase.

10. The computer-based system of claim 9, wherein the one or more advertisements are responsive to the at least one new information item.

11. The computer-based system of claim 1, wherein the user record includes a plurality of key life events.

12. The computer-based system of claim 1, further comprising a widget search engine that locates and presents to the user one or more third party widget content based on a user record of the user.

13. The computer-based system of claim 1, wherein the user creates a plurality of widgets on the hyperspace webtop for a partial capture of a code.

14. The computer-based system of claim 13, wherein the widget creation engine presents to the user a third party code in accordance with a user record of the user.

15. The computer-based system of claim 1, wherein at least one of the one or more advertisements is presented to the user with a plurality third party content.

16. The computer-based system of claim 7, wherein the one or more advertisements are presented based a plurality of key life events of the user.

17. The computer-based system of claim 7, further comprising a widget search engine configured to locate and present to the user once or more third party widget content based on a user record of the user.

18. The computer-based system of claim 7, wherein the user creates a plurality of widgets on the hyperspace webtop for a partial capture of a code.

19. The computer-based system of claim 18, wherein said widget creation engine presents to the user third party code in accordance with a user record of the user.

20. The computer-based system of claim 7, wherein at least one of the one or more advertisements is presented to the user with a plurality of third party content.

21. The computer-based system of claim 20, wherein the plurality of third party content includes at least one of a plurality of information items in exchange for a payment by a third party content provider.

22. A computer-based method comprising:
providing a monetization software engine executing on a webtop that includes a plurality of user-configurable portions, the plurality of user-configurable portions including two or more of a web site, an instant messaging (IM) service, a voice-over-IP (VOIP) service, an email account, and a social networking site;
providing a widget creation user interface on the webtop that allows creation of a widgetized avatar and selection of a virtual item for the widgetized avatar, wherein the user can drag and drop the widgetized avatar into one or more of the plurality of user-configurable portions of the webtop;
providing a tracking engine configured to track the use of the widgetized avatar with the plurality of user-configurable portions and send tracking information of the widgetized avatar to a publisher of the virtual item, wherein the publisher determines a cost for using the widgetized avatar on the plurality of user-configurable portions of the webtop;
providing a presentation engine that presents one or more advertisements to the plurality of user-configurable portions of the webtop in accordance with the tracking information of the widgetized avatar and a user record of the user;
providing a plurality of tabs.

23. The computer-based method of claim 22, user record further comprising presenting one or more advertisements on the webtop based on a plurality of key life events.

24. The computer-based method of claim 22, further comprising providing a widget search engine configured to locate and present to the user at least one third party widget content based on a user record.

25. The computer-based method of claim 22, further comprising creating a plurality of widgets for at least a partial capture of a code.

26. The computer-based method of claim 25, further comprising presenting to the user a third party code in accordance with a user record.

27. The computer-based method of claim 22, further comprising presenting to the user with a plurality of third party content.

28. The computer-based method of claim 22, wherein the plurality of third party content includes a plurality of information items in exchange for a payment by a third party content provider.

* * * * *